Sept. 20, 1927. 1,642,907
A. SUNDH
FLEXIBLE COUPLING
Filed May 16, 1923 3 Sheets-Sheet 1

INVENTOR
August Sundh
BY
Redding, Greeley, O'Shea & Campbell
his ATTORNEYS

Sept. 20, 1927. 1,642,907
A. SUNDH
FLEXIBLE COUPLING
Filed May 16, 1923 3 Sheets-Sheet 2
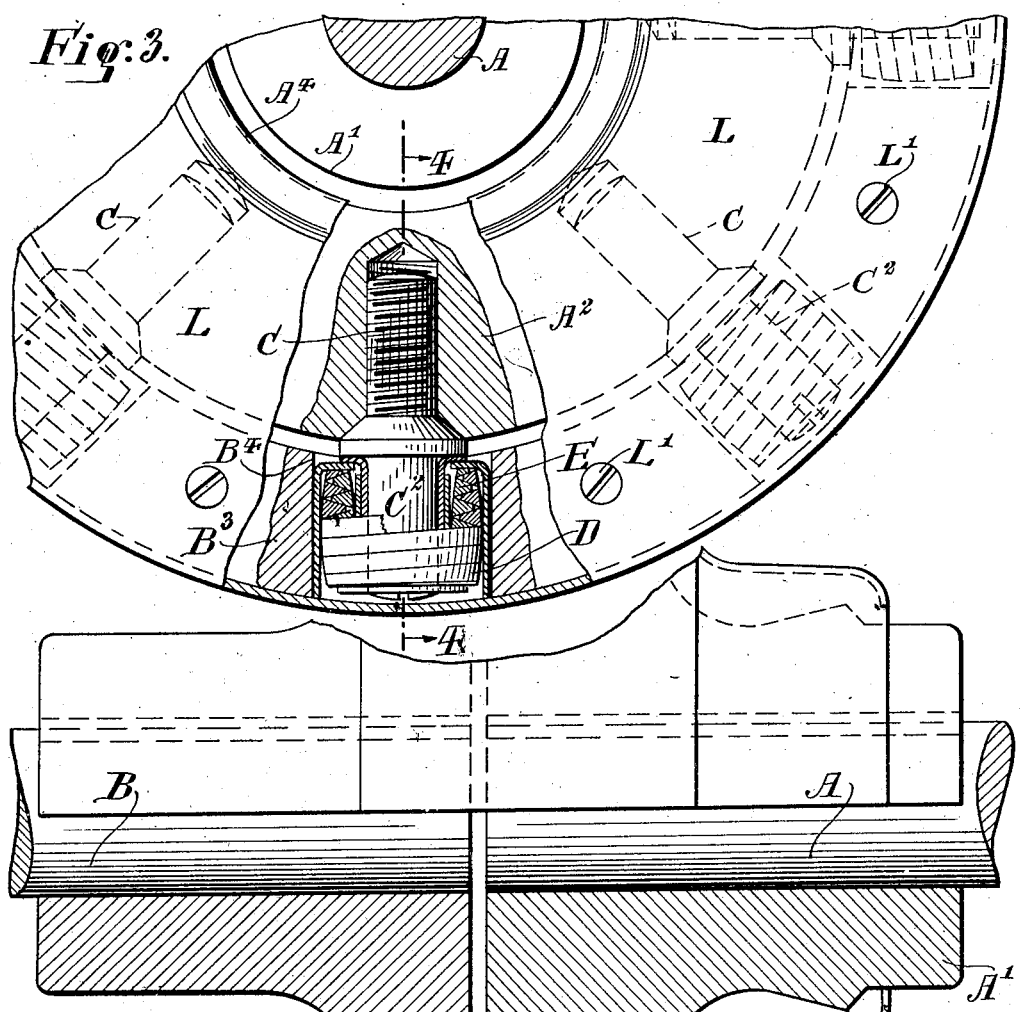
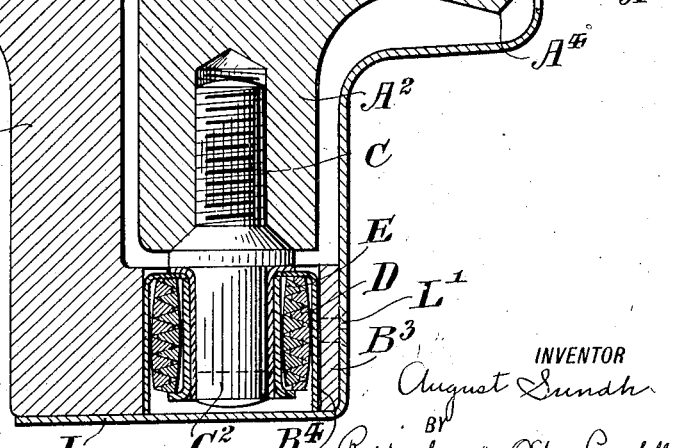
INVENTOR
August Sundh
BY Redding Greeley O'Shea & Campbell
his ATTORNEYS Sept. 20, 1927.

A. SUNDH 1,642,907

FLEXIBLE COUPLING

Filed May 16, 1923

Inventor
August Sundh
By his Attorneys
Redding Greeley O'Shea & Campbell

Patented Sept. 20, 1927.

1,642,907

UNITED STATES PATENT OFFICE.

AUGUST SUNDH, OF HASTINGS UPON HUDSON, NEW YORK.

FLEXIBLE COUPLING.

Application filed May 16, 1923. Serial No. 639,295.

This invention relates to an improved flexible coupling for transmitting driving forces from one rotating member to another. More particularly, the invention is concerned with the provision of a coupling of this character which shall be of simple and inexpensive construction and efficient mechanically for the purpose of transmitting such driving forces while affording compensation for lateral displacement of the axes of the two coupled members and for angularity therebetween.

Couplings for the purpose indicated have been proposed heretofore but have been unsatisfactory in several respects. For instance, rubber has been interposed operatively between the coupled members but it has been found that the life of the rubber is short due to friction, heat and wear and that it has to be renewed frequently. Flat springs have always been used with some degree of success but it is a fact that such springs cannot be so disposed as to yield equally in all directions and accordingly while suitable within limits for universal movement are not well adapted to compensate for any lateral displacement of the rotating elements. Coiled springs have also been employed to secure some degree of flexibility but they are inefficient in that considerable power is required to distort them by external pressure to compensate for misalignment between two high speed shafts or the like.

In accordance with the present invention it is proposed to eliminate these and other disadvantages to known devices and to provide a flexible coupling which will lend itself to the greatest degree of flexibility and compensate effectively for angularity between coupled shafts, endwise movement therebetween and lateral displacement without involving any great degree of friction, heat or wear such as results in any device where there is a tendency to bind upon relative movements between the shafts. While the invention is not to be limited to the particular application of the invention it has been designed primarily with reference to its use in the coupling of the armature of an electric motor to a shaft and the advantages may be emphasized by a description of such an embodiment. In the conditions prevailing in an electric motor the armature must be free to have a limited degree of axial movement and the coupling associated therewith should accordingly permit this degree of longitudinal movement. In its broadest aspect the invention resides in the provision of a plurality of nested helical springs which are so disposed with respect to the coupled members as to transmit driving forces therebetween and adapt themselves automatically to relative angular, longitudinal and lateral movements therebetween without binding and without friction, heat and wear such as would characterize an inefficient coupling. More particularly, the invention contemplates the association of such springs with pins carried by one member and tempered steel linings carried in aligned recesses in the other member, the springs seating on the liners and encircling the pins.

A secondary object of the invention is to provide nested helical springs of such cross-sectional form and area as to present generally bearing surfaces of curved form to facilitate their compensation for angular movements between the coupled members.

A further object of the invention is to provide in and about a flexible coupling of the character described an oil guard which will insure constant and adequate lubrication under all conditions of use and shall prevent positively the escape of oil under centrifugal action and under the conditions obtained when the parts are at rest.

The invention will be described with greater particularity with reference to the several embodiments illustrated in the drawings, wherein:

Figure 3 is a fragmentary view in end elevation of a somewhat modified construction, one of the flexible coupling elements being shown in section.

Figure 4 is a fragmentary view partly in side elevation and partly in longitudinal section of the parts shown in Figure 3 and taken on the plane indicated by the line 4—4 of Figure 3 and looking in the direction of the arrows, and showing partly the relation of the coupling disks.

As this description proceeds it will become evident that the invention is not to be limited to the application of the principle to coupling members of any particular form or arrangement nor to the particular form or number of the nested springs since these and other features of the design may be changed by one skilled in the art to meet various conditions of use. For the purposes of this application, however, there has been indicated to some extent the permissible variations which illustrate the adaptability of the principle to various conditions. In the connection of shafting there is always the problem, no matter how careful the installation, of compensating for mis-alignment, for longitudinal play in one or both of the shaft sections and for some degree of angularity therebetween. While these conditions obtain generally they are well exemplified in the problem surrounding the satisfactory connection of a shaft to the armature of an electric motor. This armature floats to some degree, its exact longitudinal position at any time depending on the action of the pole pieces. Further, some degree of universal movement as between the connected shaft and the armature is not unusual and mis-alignment laterally with respect to the shaft and the armature is frequently encountered. The improved coupling meets all three of these conditions in a simple and effective way and is free from any great degree of heat, friction or wear and transmits the driving forces efficiently. In addition, the parts are readily accessible and lend themselves conveniently to ready assembling and disassembling as for purposes of inspection or replacement.

Figure 1:
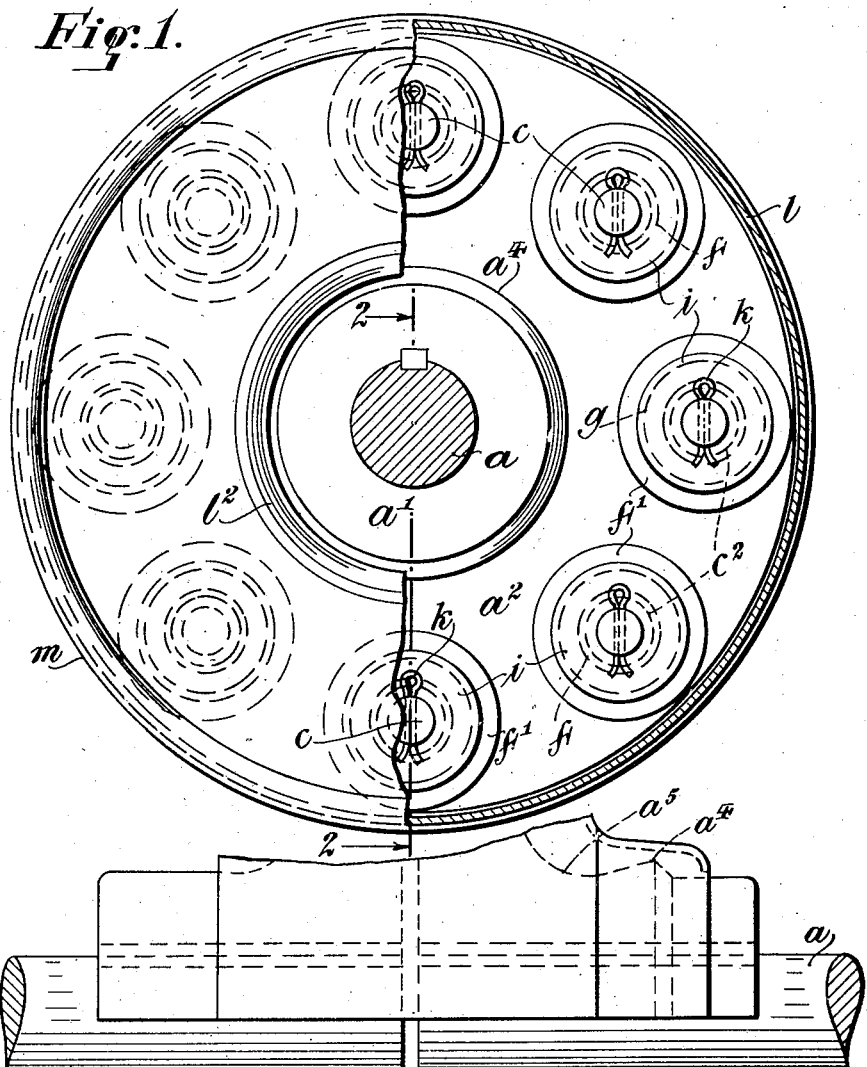
Figure 1 is a view in end elevation showing an improved coupling incorporated in flat disks carried with the rotating members, part of the oil guard being broken away in the interest of clearness.
Figure 2:
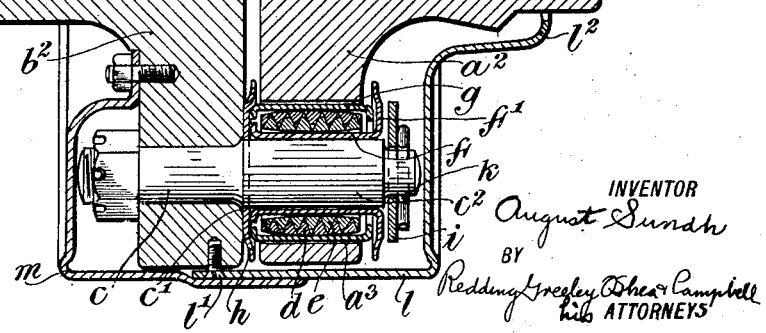
Figure 2 is a fragmentary view partly in side elevation and partly in longitudinal section of the parts shown in Figure 1 and taken on the plane indicated by the line 2—2 of Figure 1 and looking in the direction of the arrows.

Referring now to Figures 1 and 2 the shaft or armature in an electric motor, for instance, may be considered as indicated at $a$ and the shaft driven thereby as at $b$. On the proximate ends of these shafts are keyed or otherwise secured the hubs $a'$, $b'$, of disks $a^2$, $b^2$, respectively. In one of these disks $b^2$, are fixed an annular row of pins $c$ which protrude from the face of the disk and rest within a plurality of aligned holes $a^3$ in the other disk $a^2$. The pins $c$ may be shouldered as at $c'$ and the portions $c^2$ which extend through the holes $a^3$ may be of enlarged diameters as indicated, primarily for convenience in assembling and to prevent endwise movement. The diameter of each of the holes $a^3$ is greater than the diameter of the enlarged portion $c^2$ of each pin $c$ and in the annular space thus provided is disposed the improved flexible spring coupling members which encircle the said portions $c^2$. Each of these flexible coupling members comprises a plurality of nested helical springs $d$, $e$, whose coils interact to afford flexiblility in all directions, pressure applied externally to one of the coils serving to spread the coils of the other spring and vice versa. In the preferred form each pin $c^2$ has thereon a hardened metal bushing $f$ which the innermost coil $e$ embraces while each hole $a^3$ in the disk $a^2$ is provided with a hardened metal liner $g$ on which the outer coil $d$ seats. The bushing $f$ may be formed with a flange $f'$ at its outer end to limit the endwise movement of the parts to some degree and a circular metal thrust plate $h$ may serve to back up the inner end of the parts. At the outer end of the pins $c^2$ may be secured a limit ring $i$ as by means of a cotter pin $k$ or other retaining device these parts being fully exposed and permitting the assembling and disassembling of all of the elements described. It has been found in practice that the most efficient results are realized when the coils of the springs $d$, $e$, are of generally triangular truncated cross-sectional form so as to afford comparatively large bearing surfaces when they engage either the bushing $f$ or the liner $g$ thereby reducing the amount of unit pressure thereon. Again, in the preferred form, the dimensions and form of the nested springs will be such as to present a generally curved external surface bearing on the bushing $f$ and the liner $g$ so that under relative angular movements of the coupled shafts $a$, $b$, the springs may rock freely to adapt themselves as a unit to the changed positions.

While the invention is also concerned with the improved oil guard for the flexible coupling a description of the method of operation of the flexible elements will be given before considering this guard. Relative longitudinal movement between the shafts $a$ and $b$ is afforded by the nested springs $d$, $e$, without interference and without changing the effective relation between the parts for the transmission of driving forces. Relative angular movement between the shafts $a$ and $b$ may rock the nested springs $d$, $e$, on their bearings and may change the relation between their coils somewhat, this last named compensation being afforded by a spread of the coils. Lateral mis-alignment of the shafts or lateral displacement therebetween is compensated for effectively by a spreading of the coils at one side and corresponding closure thereof at the opposite side as will be evident when the wedge like relation and action between the nested coils is considered. One coil $d$ is free to move bodily with respect to the other coil either towards or away from their common axis depending upon the direction and extent of the lateral pressure exerted thereon. However, any such displacement will not affect the efficiency of the transmitting of the driving forces through the nested springs from one member to another. The parts are wholly accessible for initial assembling or disassembling and the friction and wear thereon is so little that infrequent renewals are required.

As illustrated in Figure 2 the hub $a'$ on one of the shafts $a$ is formed with an annular shoulder or flange $a^4$ which provides in conjunction with the disk $a^2$ an oil channel $a^5$. Embracing the flange $a^4$ and all of the flexible coupling elements described is a generally circular oil guard $l$ which is preferably secured to the other disk $b^2$ as by means of screws $l'$. The disk $b^2$ has bolted to its face a complementary circular section $m$ which telescopes over the section $l$ and forms with it an oil tight guard which prevents the escape of oil at all times. The section $l$ preferably terminates in a circular flange $l^2$ disposed in proximity to the hub $a'$ and forming with the flange $a^4$ a labyrinth which prevents the escape of sprayings, drippings or the like.

The principle heretofore described is carried into the form of flexible couplings shown in Figures 3 and 4. The principal modification is found in the relation of the disks $A^2$, $B^2$. The disk $B^2$ is formed with an annular flange $B^3$ in which is nested the disk $A^2$ which has secured in its periphery a plurality of radially extending pins C the outer ends $C^2$ of which rest within aligned holes $B^4$ formed in the annular flange $B^3$. All of the other parts correspond essentially to those described in connection with the embodiment illustrated in Figures 1 and 2, the nested coiled springs D, E, being disposed in the same general relationship to the associated parts and to each other. However, it will be observed that in operation the spreading of the coils of the spring D, E, will be most pronounced upon relative longitudinal movement between the coupled shafts A, B, since the coils extend laterally of said shafts. Lateral displacement or misalignment of the shafts A, B, on the other hand, will be afforded by the springs D, E, in the manner described with reference to longitudinal movement of the shafts $a$, $b$, in Figure 2.

As indicated in Figure 4 the hub $A'$ is formed with an annular shoulder $A^4$ which retains the oil and an oil guard L is secured as by means of screws $L'$ to the face of the flange $B^3$ for the purpose of enclosing the parts and retaining the oil in exactly the manner described with reference to the guard illustrated in Figure 2.

Figure 5:
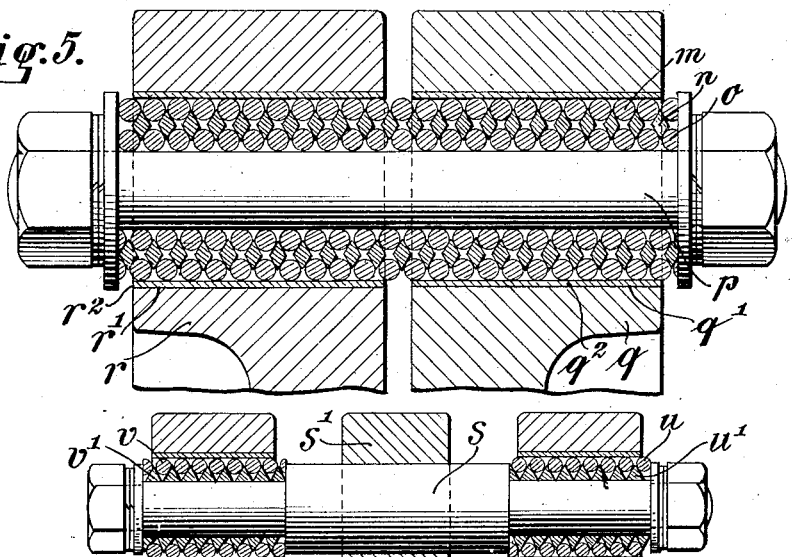
Figure 5 is a fragmentary view in section showing a modified construction in which three helical springs are nested and their cross-sectional form adapted to the conditions of use.

The nested springs are shown in the embodiments of Figures 1–4 as of generally truncated triangular cross-sectional form and as being two in number. However, the invention is not to be limited to such a form of springs nor to their number since the same spreading action might be secured, for example, by such relationship as is illustrated in Figure 5. In this form, there are three nested helical springs $m$, $n$ and $o$, the outer one $m$ and the inner one $o$ of which may be of circular cross sectional form while the intermediate one $n$ may be generally diamond shaped in cross-sectional form with the opposed apices of the diamond extending between the circular coils of the springs $m$, $o$, respectively. In this embodiment a spreading action and automatic adaptation to different relative positions between the coupled shafts results in substantially the manner heretofore described, the intermediate spring $n$ wedging itself laterally between the coils of the proximate springs as may be necessary. Another modification is indicated by this figure inasmuch as a through pin $p$ extends between the coupled disks $q$, $r$, and is encircled by the nested springs substantially throughout its length. Aligned holes $q'$, $r'$, in the proximate disks receive the pin $p$ and have metal liners $q^2$, $r^2$, respectively, therein to receive the springs.

Figure 6:
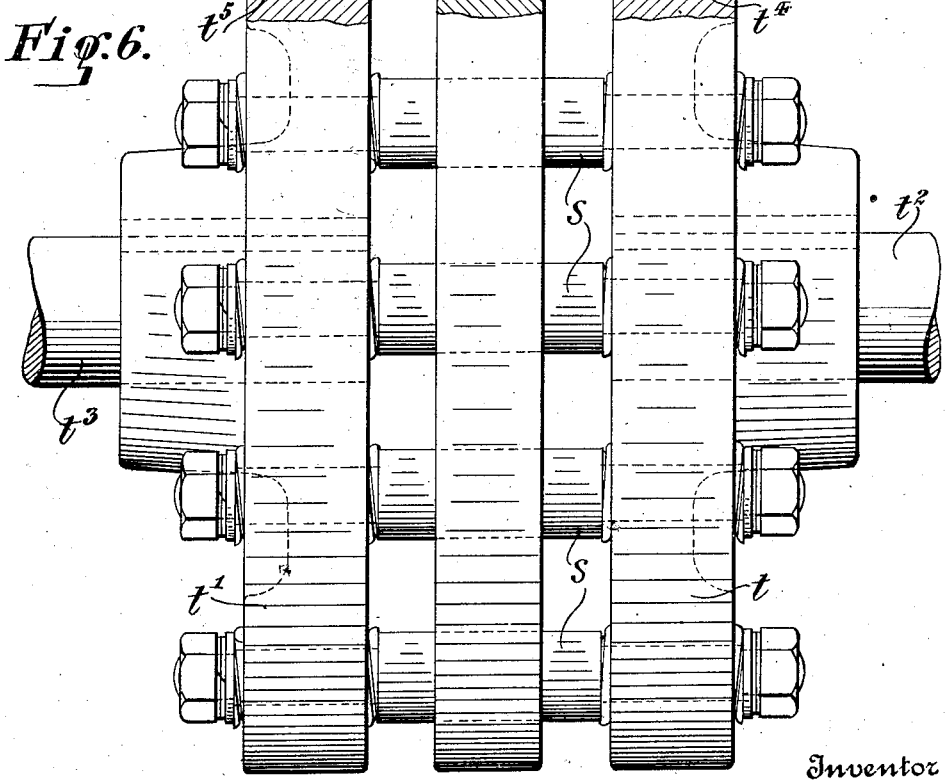
Figure 6 is a view in side elevation of a flexible coupling embodying the invention and in which three disks are employed with a corresponding number of additional flexible elements to effect a wider range of compensation.

In the embodiment shown in Figure 6 the flexibility is increased materially by fastening pins $s$ in an independent intermediate disk $s'$ disposed between disks $t$, $t'$ carried on the coupled shafts $t^2$, $t^3$, respectively. The pins $s$ protrude from the opposite faces of the disk $s'$ and extend into aligned holes $t^4$, $t^5$, in the coupled disks $t$, $t'$, respectively, and nested springs $u$, $u'$, rest in the holes $t^4$ and encircle the end of the pin $s$ and other nested springs $v$ $v'$, rest in the other holes $t^5$ and encircle the other end of the pins $s$, respectively. In this modified view it appears that one of the springs $u'$, $v'$, in each flexible unit is of generally triangular cross-sectional form while the other spring $u$, $v$, of each unit, respectively, is of generally circular cross-sectional form, but nevertheless, the action hereinbefore described is secured effectively for the purpose of affording the desired degree of flexibility as between the coupled shafts $t^2$ $t^3$. By disposing flexible coupling units in each of the disks $t$, $t'$, it will be understood that a much greater degree of flexibility is attained.

As indicated hereinbefore, the principle on which the invention rests may find itself embodied in many different forms depending upon the particular conditions of use to be met and variations in numbers, form or dimensions in the elements such as would suggest themselves to one skilled in the art are to be deemed within the scope of the invention.

What I claim is:

1. In a flexible coupling the combination of a driving member and a driven member and driving connections between said members including helically wound springs with the coils nested for obtaining a yielding action in all directions.

2. In a flexible coupling a plurality of members, driving connections between said members and helically wound nested springs for said connections for obtaining a yielding action in all directions when the coupling is rotated.

3. In a flexible coupling a driving member and a driven member, driving connections between said members consisting of pins and helically wound nested springs around said pins.

4. In a flexible coupling a driving member and a driven member, driving connections between said members consisting of pins and helically wound nested springs around said pins, and tempered steel liners between the pins and the helically wound springs.

5. In a flexible coupling a driving member and a driven member, driving connections between said members consisting of pins and helically wound nested springs around said pins, tempered steel liners between the pins and the helically wound springs, and steel liners around the hellically wound springs for preventing wearing of the holes in the member.

6. In a flexible coupling the combination of a driving member and a driven member and driving connections between said members including helically wound springs with the coils nested for obtaining a yielding action in all directions, the wearing surfaces of the coils of the said springs being V-shaped and engaged for yielding action under stresses.

7. In a flexible coupling the combination of a driving member and a driven member and driving connections between said members including helically wound springs with the coils nested for obtaining a yielding action in all directions, the said nested springs being of different diameters and adapted to yield under stresses.

8. In a flexible coupling the combination of a driving member and a driven member a helically wound spring engaged with the driving member and adapted to receive driving force therefrom at right angles to the axis of the spring, a driven member, a helically wound spring nested with respect to the first named spring and engaged with the driven member and adapted to transmit driving force thereto along a line at right angles to the axis of the second named spring, the said driving force from the driving member being transmitted from the first named spring to the second named spring.

This specification signed this 8th day of May A. D. 1923.

AUGUST SUNDH.